ns patent office
3,497,537
Patented Feb. 24, 1970

3,497,537
ORGANOTIN DIOXABORINANE COMPOUNDS
Richard H. Fish, Tustin, Calif., assignor to United States Borax & Chemical Corporation, Los Angeles, Calif., a corporation of Nevada
No Drawing. Filed Sept. 19, 1967, Ser. No. 668,936
Int. Cl. C07d *107/02;* C07f *7/22;* A01n *9/00*
U.S. Cl. 260—429.7                    8 Claims

ABSTRACT OF THE DISCLOSURE

Substituted 1,3-dioxa-2-borinane compounds having organotin substituents at the 2-position of the boron-containing ring. The compounds are useful as herbicides.

---

This invention relates to cyclic organoboron tin compounds and more particularly, it relates to novel triorganotin 1,3-dioxa-2-borinane compounds.

According to the present invention, there are provided compounds of the formula

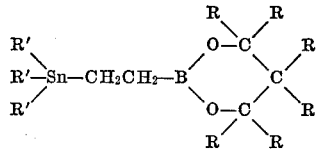

in which R' is alkyl, aralkyl, or aryl and R is hydrogen or alkyl, at least one of said R's being alkyl. Thus, each R in the above formula can represent the same or different alkyls or hydrogen but at least one carbon atom of the boron-containing ring must have at least one alkyl substituent. Preferably, at least one R is a lower alkyl group, such as methyl, ethyl, propyl, or butyl. R' can represent the same or different alkyl, aralkyl or aryl group, especially the lower alkyl radicals and the monocyclic aralkyl and aryl groups, such as benzyl, phenylethyl, phenyl, and substituted phenyls as for example, the halophenyls and lower alkylphenyls.

The compounds are generally colorless, high boiling liquids which are soluble in the usual hydrocarbon and ether solvents. They are readily prepared by reaction of the corresponding organotin hydride with the corresponding 2-vinyl dioxaborinane compound. The reaction can be illustrated by the following equation, in which R and R' have the significance previously assigned.

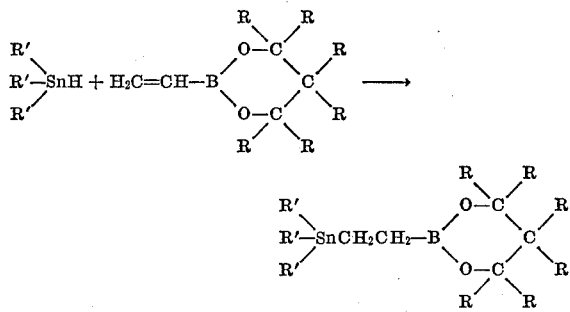

About equimolar amounts of reactants can be used although an excess of the dioxaborinane compound is generally preferred. The reaction takes place in the absence of a solvent since the tin hydride adds by a free radical mechanism. However, if desired, an inert solvent, such as the hydrocarbons can be employed although their use does not appear to offer any advantage. The reactants are heated to an elevated temperature, such as in the range of from about 50° to about 150° C. and preferably a catalytic amount of a catalyst, such as azobisisobutyronitrile, is added to accelerate the rate of reaction. The desired product is isolated and purified, such as by fractional distillation under reduced pressure according to procedures well known to those skilled in the art.

The following examples illustrate the preparation of typical compounds according to this invention, but it is to be understood that the invention is not to be limited to the specific examples given.

EXAMPLE I 2-($\beta$-trimethyltinethyl)-4,4,6-trimethyl-1,3-dioxa-2-borinane To 6.8 grams (0.041 mole) of trimethyltin hydride was added 12.4 grams (0.082 mole) of 2-vinyl-4,4,6-trimethyl-1,3-dioxa-2-borinane in a glass ampul. The ampul was sealed at $-78°$ C. and then heated in a bath at 110° C. for 30 hours. The reaction product was distilled under reduced pressure to give 9.12 grams (70%) of product, B.P. 59° C./0.1 mm.; $n_D^{25}$ 1.4671.

EXAMPLE II 2-($\beta$-triphenyltinethyl)-4,4,6-trimethyl-1,3-dioxa-2-borinane In a flask equipped with a magnetic stirring bar and reflux condenser was placed 4.09 grams (0.025 mole) of 2-vinyl-4,4,6-trimethyl-1,3-dioxa-2-borinane and 8.0 grams (0.023 mole) of triphenyltin hydride in 40 ml. of hexane. A catalytic amount (2 mole percent) of azobisisobutyronitrile was added and the reaction mixture refluxed for 8 hours. The hexane was removed by distillation under reduced pressure. The residue was distilled to give 4.0 grams (38%) of product, B.P. 205°-215° C./0.7 mm.

The following are among the many other compounds which can be prepared according to the general procedure of Examples I and II.

2-($\beta$-triethyltinethyl)-4,4,6-trimethyl-1,3-dioxa-2-borinane, B.P. 110°-112° C./0.15 mm.; $n_D^{25}$ 1.4779
2-($\beta$-tripropyltinethyl)-4,4,6-trimethyl-1,3-dioxa-2-borinane, B.P. 136°-137° C./0.5 mm.; $n_D^{21}$ 1.4791
2-($\beta$-tri-n-butyltinethyl)-4,4,6-trimethyl-1,3-dioxa-2-borinane, B.P. 135°-137° C./0.3 mm.; $n_D^{25}$ 1.4750

The compounds of this invention are useful as herbicides and can be formulated with the usual herbicide carriers for use in controlling unwanted plants. They can be applied to the plants as either a pre-emergence or post-emergence treatment at a rate preferably in the range of from about 2 to about 20 pounds per acre. The following example illustrates the herbicidal activity of a representative compound of this invention.

EXAMPLE III

A greenhouse flat was planted to corn, millet, ryegrass, oats, peas, mustard, cucumbers and snap beans and on the same day of planting, the flat was sprayed with a methanol solution of 2-($\beta$-tri-n-butyltinethyl)-4,4,6-trimethyl-1,3-dioxa-2-borinane at a rate of 12.5 pounds per acre. The flat was kept in the greenhouse and watered as needed. Thirty-five days after treatment, the flat was evaluated for herbicidal effect. The plants were rated on a 0 to 10 basis in which 0 represents no effect, and 10 represents complete kill. The following results were obtained.

| Plant species: | Herbicidal effect |
|---|---|
| Corn | 0 |
| Millet | 10 |
| Ryegrass | 10 |
| Oats | 10 |
| Peas | 10 |
| Mustard | 10 |
| Cucumbers | 10 |
| Snap beans | 10 |

Thus, as illustrated in the preceding example, the organotin dioxaborinane compounds of this invention are excellent herbicides useful for the control of unwanted plants.

Various changes and modifications of the invention can be made and, to the extent that such variations incorporate the spirit of this invention, they are intended to be included within the scope of the appended claims.

What is claimed is:

1. A compound of the formula

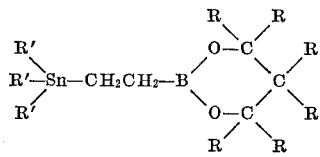

in which R' is alkyl, aralkyl, or aryl and R is hydrogen or alkyl, at least one of said R's being alkyl.

2. A compound according to claim 1 in which R' is lower alkyl.

3. A compound in accordance with claim 1 in which the boron-containing ring is 4,4,6-trimethyl-1,3-dioxa-2-borinane.

4. A compound in accordance with claim 3 in which R' is lower alkyl.

5. A compound in accordance with claim 3 in which R' is phenyl.

6. A compound according to claim 1 in which R' is n-butyl.

7. 2-($\beta$-tributyltinethyl) - 4,4,6 - trimethyl - 1,3-dioxa-2-borinane.

8. 2-($\beta$-trimethyltinethyl) - 4,4,6 - trimethyl-1,3-dioxa-2-borinane.

References Cited

UNITED STATES PATENTS

| | | | |
|---|---|---|---|
| 3,398,169 | 8/1968 | Neumann et al. | 260—429.7 |
| 3,256,253 | 6/1966 | Neumann et al. | 260—429.7 X |
| 2,904,569 | 9/1959 | Ramsden | 260—429.7 |
| 2,904,570 | 9/1959 | Ramsden | 260—429.7 |
| 3,312,725 | 4/1967 | Weissenberger | 260—429.7 |
| 3,188,331 | 6/1965 | Weissenberger | 260—429.7 X |

DANIEL E. WYMAN, Primary Examiner

W. F. W. BELLAMY, Assistant Examiner

U.S. Cl. X.R.

424—185, 288